United States Patent [19]

Fujiwara et al.

[11] Patent Number: 6,051,166
[45] Date of Patent: *Apr. 18, 2000

[54] INDIUM OXIDE-TIN OXIDE POWDERS AND METHOD FOR PRODUCING THE SAME

[75] Inventors: Shinji Fujiwara; Akira Hasegawa; Kunio Saegusa, all of Ibaraki, Japan

[73] Assignee: Sumitomo Chemical Corporation, Limited, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/760,217

[22] Filed: Dec. 4, 1996

[30] Foreign Application Priority Data

Dec. 6, 1995 [JP] Japan .................................. 7-317842
May 30, 1996 [JP] Japan .................................. 8-136589

[51] Int. Cl.⁷ .......................... H01B 1/08; C01G 19/02; C01G 1/02
[52] U.S. Cl. ........................ 252/520.1; 423/92; 423/122; 423/624; 264/104
[58] Field of Search ............... 252/520.1, 521.5; 75/255; 423/593, 618, 624, 89, 92, 122; 264/104

[56] References Cited

U.S. PATENT DOCUMENTS

| | | | |
|---|---|---|---|
| 4,937,148 | 6/1990 | Sato et al. | 423/618 |
| 5,071,800 | 12/1991 | Iwamoto et al. | 501/126 |
| 5,492,762 | 2/1996 | Hirai et al. | 428/447 |
| 5,529,720 | 6/1996 | Hayashi et al. | 252/518 |

FOREIGN PATENT DOCUMENTS

| | | |
|---|---|---|
| 0386932 | 9/1990 | European Pat. Off. . |
| 0584672 | 3/1994 | European Pat. Off. . |
| 62-7627 | 1/1987 | Japan . |
| 3-126655 | 5/1991 | Japan . |
| 3-207858 | 9/1991 | Japan . |
| 3-215318 | 9/1991 | Japan . |
| 4-219315 | 8/1992 | Japan . |
| 4-325415 | 11/1992 | Japan . |
| 5-148638 | 6/1993 | Japan . |
| 5-193939 | 8/1993 | Japan . |
| 5-222410 | 8/1993 | Japan . |
| 7-188912 | 7/1995 | Japan . |
| 7-335031 | 12/1995 | Japan . |

OTHER PUBLICATIONS

Patent Abstracts of Japan, Abstract of JP–A 5–201731, Aug.1993.
Chemical Abstract, vol. 119, No. 8 (1993), Abstract of JP–A 4–367511 Dec. 1992.
Patent Abstracts of Japan, Abstract of JP–A 60–186416 Sep. 1985.
Patent Abstracts of Japan 1993 vol. 17/No. 638 Nov., 1993.
Patent Abstracts of Japan vol. 15/No. 500 Dec. 1991.
Patent Abstracts of Japan vol. 15/No. 202 May 1991.
Derwent Abstract 95–363477/47.
Derwent Abstract 95–299362/39.
Derwent Abstract 87–052878/08.
Patent Abstracts of Japan, vol. 18, No. 525, Oct. 5, 1994.
Patent Abstracts of Japan, vol. 18, No. 337, Jun. 27, 1994.
Patent Abstracts of Japan, vol. 14, No. 555, Dec. 10, 1990.

*Primary Examiner*—Mark Kopec
*Attorney, Agent, or Firm*—Sughrue, Mion, Zinn, Macpeak & Seas, PLLC

[57] ABSTRACT

A method for producing an indium oxide-tin oxide powder, which comprises supplying to react an aqueous solution of an indium salt, an aqueous solution of a tin salt and an aqueous alkaline solution into water at 40° C. or more and less than 100° C. so that the pH during the reaction is maintained within the range from 4 to 6, forming a precipitate, washing the formed precipitate after solid-liquid separation, and calcining the precipitate at 600° C. or more and 1300° C. or less.

24 Claims, No Drawings

INDIUM OXIDE-TIN OXIDE POWDERS AND METHOD FOR PRODUCING THE SAME

BACKGROUND OF THE INVENTION

FIELD OF THE INVENTION

The present invention relates to an indium oxide-tin oxide powder, and a method for producing the same. More particularly, it relates to an indium oxide-tin oxide powder which is superior in sintering properties, and a method for producing the same.

BACKGROUND INFORMATION

An indium oxide-tin oxide (Indium-Tin-Oxide: hereinafter referred to as "ITO", sometimes) thin film containing 2 to 20% by weight of tin oxide is utilized as a transparent conductive film for liquid crystal display because of its high electric conductivity and high transparency.

Examples of the method of forming an ITO thin film include a method of applying a paste containing an ITO fine powder on a substrate, a method of forming an ITO film on the surface of a substrate according to a sputtering method using an ITO target obtained by sintering and the like. The method of applying the ITO powder on the substrate is inferior to the sputtering method in film quality and performance of the obtained ITO film.

In the method of producing the ITO thin film according to the sputtering method using the ITO target, there arose problems such as deterioration of the sputtering efficiency (e.g. formation of nodule at a surface of ITO target, decrease in film forming rate, etc.) and deterioration of the electric conductivity and trancsparency of the ITO thin film, when using an ITO target having low density which is lower than 90% of the theoretical density. Therefore, there has been required to develop a high-density ITO sintered body and an ITO powder capable of producing a high-density ITO sintered body.

Japanese Patent Kokai (laid-Open) No. 62-7627 discloses a method of producing an ITO powder (coprecipitation method) wherein tin oxide is uniformly distributed, which comprises mixing an aqueous mixed solution of an indium salt and a tin salt with a precipitate forming agent such as agueous ammonia to obtain a precipitate containing indium and tin and drying the precipitate, followed by calcining, as the method of producing the ITO powder as the raw material of the ITO sintered body.

In the production of the ITO powder by a conventional coprecipitation method, however, it is not easy to collect the precipitate containing indium and tin by solid-liquid separation(e.g. filtration), because the precipitate, which is obtained as a precursor of the ITO powder, is in a state of gel. The dried material of the precipitate becomes a hard agglomerated mass and the ITO powder obtained by calcining the dried material contains a large amount of coarse agglomerated particles wherein primary particles are strongly sticked each other and, therefore, deagglomeration is not easy. When the ITO sintered body is made by using the ITO powder containing a large amount of agglomerated particles, it was difficult to obtain an ITO sintered body having high density larger than 90% of the theoretical density.

In order to solve these problems, for example, Japanese Patent Kokai (Laid-Open) No. 3-215318 discloses that an ITO sintered body having high density larger than 75%, preferably 85%, of the theoretical density by using an ITO powder obtained by mechanically grinding an ITO powder comprising fine particles having a primary particle size of 1 μm or less, obtained by the coprecipitation method, using a vibration type grinder of high grinding efficiency. According to this Japanese Patent, for example, an ITO powder capable of producing a high-density ITO sintered body can not be obtained when using a ball mill. This method had a problem that some grinding medium is likely to cause contamination with impurities because an ITO powder is ground using the vibration type grinder.

Examples of the sintering method of obtaining a high-density ITO sintered body include hot press (hereinafter referred to as "HP"), hot isostatic press (hereinafter referred to as "HIP") and the like. According to these sintering methods, sintering is conducted under pressure. Since sintering is conducted in a reducing atmosphere, however, tin oxide is reduced when the sintering temperature is 1100° C. or more. Therefore, solid solution of tin oxide in ITO becomes insufficient and heterogeneous so that only an ITO sintered body having high resistance has ever been obtained. These methods have a problem that the production cost becomes high because expensive equipments are required.

Japanese Patent Kokai (Laid-Open) No.3-207858 discloses a method of sintering in a pressurized oxygen atmosphere, as the sintering method of producing the high-density ITO sintered body. However, this method has a problem that the production cost becomes high because a special sintering furnace capable of being proof against high pressure, as an expensive equipment, is required so as to sinter in the pressurized oxygen atmosphere. It also had a problem about safety because of sintering in a high-pressure oxygen atmosphere.

After extensive studies for seeking a method, having no such problems, for producing an ITO powder, the present inventors have found that the ITO powder with a weak agglomerating force among primary particles, capable of producing a high-density ITO sintered body, can be produced by calcining a precipitate containing indium and tin, which is obtained by reacting while the pH is maintained at 4–6. The present inventors have also found that a high-density ITO sintered body can be obtained by sintering the ITO powder under a specific temperature condition, and thus have completed the present invention.

SUMMARY OF THE INVENTION

The present invention provides a method for producing an indium oxide-tin oxide powder, which comprises supplying to react an aqueous solution of an indium salt, an aqueous solution of a tin salt and an aqueous alkaline solution into water at 40° C. or more and less than 100° C. so that the pH during the reaction is maintained within the range from 4 to 6, forming a precipitate, washing the formed-precipitate after solid-liquid separation, and calcining the precipitate at 600° C. or more and 1300° C. or less.

DETAILED DESCRIPTION OF THE INVENTION

The present invention will be described below in more detail.

Examples of the aqueous solution of the indium salt used in the method for producing the indium oxide-tin oxide powder of the present invention include those prepared by dissolving water-soluble indium salts such as indium chloride ($InCl_3$), indium nitrate ($In(NO)_3$), indium sulfate ($In_2(SO_4)_3$) and the like in water or those prepared by dissolving metallic indium in an aqueous hydrochloric acid solution, an aqueous nitric acid solution and the like, but are not limited thereto.

Examples of the aqueous solution of the tin salt used in the method for producing the indium oxide-tin oxide powder of the present invention include those prepared by dissolving water-soluble tin salts such as tin chloride ($SnCl_4$, $SnCl_2$), tin sulfate ($SnSO_4$) and the like in water or those prepared by dissolving metallic tin in an aqueous hydrochloric acid solution, but are not limited thereto.

Examples of the aqueous mixed solution of the indium salt and tin salt used in the method for producing the indium oxide-tin oxide powder of the present invention include those prepared by dissolving water-soluble indium salts (e.g. indium chloride, indium nitrate, etc.) and water-soluble tin salts (e.g. tin chloride, etc,.) in water, those prepared by mixing those prepared by dissolving metallic indium in an aqueous hydrochloric acid solution, an aqueous nitric acid solution and the like with those prepared by dissolving metallic tin in an aqueous hydrochloric acid, those prepared by dissolving an indium-tin alloy in an aqueous hydrochloric acid solution and the like, but are not limited thereto.

The concentration of indium in the aqueous solution of the indium salt and aqueous mixed solution of the indium salt and tin salt is not specifically limited, but is preferably within the range from about 20 to 400 g/l. When the concentration of indium is less than 20 g/l, the productivity of the ITO powder may be lowered.

The concentration of tin in the aqueous solution of the tin salt and aqueous mixed solution of the indium salt and tin salt may be decided by a relation between the concentration of indium and that of tin, corresponding to the weight of the tin oxide contained in the ITO powder which is finally obtained. The concentration of the aqueous solution of the indium salt and tin salt may be adjusted so that the content of the tin oxide in the finally obtained ITO powder becomes 2% by weight or more and 20% by weight or less, taking the electric conductivity of ITO into consideration.

The aqueous solution of the indium salt, the aqueous solution of the tin salt and the aqueous alkaline solution are supplied in water at 40° C. or more and less than 100° C. so that the pH during the reaction is maintained within the range from 4 to 6, and then the solutions are reacted to form a precipitate containing indium and tin.

Alternatively, the aqueous mixed solution of the indium salt and tin salt, and the aqueous alkaline solution are supplied in water at 40° C. or more and less than 100° C. so that the pH during the reaction is maintained within the range from 4 to 6, and then the solutions are reacted to form a precipitate containing indium and tin.

Among the above two methods, the method of using the aqueous mixed solution of the indium salt and tin salt is preferred because the pH during the reaction is easily controlled within the range from 4 to 6. Although the method of using the aqueous mixed solution of the indium salt and tin salt is exclusively explained hereinafter, the method of separately using the aqueous solution of the-indium salt and the aqueous solution of the tin salt can also be used by controlling the supplying rate of each aqueous solution according to the method of using the aqueous mixed solution of the indium salt and tin salt.

Examples of the aqueous alkaline solution used include aqueous ammonia, aqueous sodium hydroxide solution and the like. It is preferred to use aqueous ammonia wherein a metallic ion is not included into the precipitate containing indium and tin.

According to the reaction method, for example, a predetermined amount, predetermined temperature and predetermined pH of water (e.g. distilled water, deionized water, etc.) is firstly charged in a reaction vessel and stirred. Then, the aqueous mixed solution of the indium salt and tin salt and the aqueous alkaline solution is supplied into water with stirring. Since the pH of the reaction system is lowered by supplying the aqueous mixed solution of the indium salt and tin salt, a required amount of the aqueous alkaline solution is supplied so that the pH during the reaction is maintained within the range from 4 to 6.

The predetermined pH can be maintained by a method of interlocking a pH controller with a pump for supplying the aqueous alkaline solution and operating the pump when the pH value becomes smaller than the predetermined pH value.

It is also one of a preferred method for maintaining the pH within the range from 4 to 6 during the reaction that the pH of the aqueous mixed solution of the indium salt and tin salt used for the reaction is adjusted to the degree at which the-precipitate of indium and tin is not formed, e.g. about 0–2 by previously adding the aqueous alkaline solution such as aqueous ammonia to the aqueous mixed solution because the aqueous mixed solution exhibits strong acidity.

The temperature of water in the reaction vessel is 40° C. or more and less than 100° C. When the temperature of water is less than 40° C., a long time is consumed for collecting the precipitate by filteration (the filterability of the obtained precipitate is deteriorated) and, furthermore, the dried material of the precipitate becomes a hard agglomerated mass, and this agglomerated mass can't be easily deagglomerated. (which results in deterioration of deagglomeration ability.) The aqueous mixed solution of the indium salt and tin salt can be supplied in an industrially advantageous rate. The supplying rate varies depending on the scale of forming the precipitate containing the indium salt and tin salt. The time required for supplying the total amount of the aqueous mixed solution of the indium salt and tin salt is preferably 10 minute or more and 300 minutes or less, more preferably 20 minutes or more and 200 minutes or less. When the supplying time of the aqueous mixed solution of the indium salt and tin salt exceeds 300 minutes, a degree of agglomeration among primary particles in the finally obtained ITO powder may become stronger. In this case, it is also possible to conduct the calcination after reducing the amount of the agglomerated particles by deagglomerating the dried material of the precipitate obtained by solid-liquid separation and drying, as described hereinafter.

The aqueous alkaline solution may be supplied simultaneously so that the pH during the reaction can be maintained within the range from 4 to 6, and the supplying rate is not specifically limited.

It is necessary that the pH during the reaction is maintained within the range from 4 to 6, preferably 4.5 to 5.5. A precipitate containing indium and tin, which has an uniform particle size and good filterability and deagglomeration ability after drying can be obtained by reacting with maintaining the pH within this range.

When the reaction is conducted with maintaining the pH during the reaction within the range of larger than 6, a fine precipitate containing indium and tin can be obtained. Therefore, not only a long time is consumed for filtration but also a hard agglomerated mass is formed after drying, and this agglomerated mass can't be easily deagglomerated. When the reaction is conducted with maintaining the pH within the range of less than 4, a precipitate is not formed and an amount of indium dissolved in the solution becomes large and the finally yield is lowered.

The range of the change in pH during the reaction is controlled within the range of preferably ±1.0, more preferably ±0.5, in the above pH range.

In the initial stage of the reaction, the pH is sometimes out of the range from 4 to 6. Particularly, a rapid decrease in pH immediately after beginning of supplying the aqueous mixed solution of the indium salt and tin salt, and a rapid increase in pH after beginning of supplying the aqueous alkaline solution may arise. If this phenomenon arises only at the initial stage of the reaction, the filterability of the obtained precipitate containing indium and tin and deagglomeration ability of the dried material of the precipitate are not affected by the phenomenon.

Accordingly, the rapid change in pH at the initial stage of this reaction can be permitted. The reaction is conducted so that the time at which the rapid change in pH at the initial stage of the reaction arise is within 10%, more preferably 5%, of the total reaction time (the time required for supplying the total amount of the aqueous mixed solution of the indium salt and tin salt). Although the pH is sometimes out of the above range, locally or instantaneously, in the reaction system, a little change in pH can be permitted so far as the object of the present invention can be accomplished without departing from the scope of the invention.

After the completion of supply of the aqueous mixed solution of the indium salt and tin salt, the formed precipitate containing indium and tin is preferably aged. As the aging method, a method of stirring or allowing to stand the suspension containing the formed precipitate can be used. The aging temperature is the same as the reaction temperature and is preferably 40° C. or more and less than 100° C. By conducting this aging, the particle size becomes uniform and the filtering properties of the precipitate and deagglomerating properties of the dried material of the precipitate are improved furthermore.

The precipitate containing indium and tin is sedimented at the bottom of the reaction vessel by aging with standing. The volume of the obtained sedimentation is about from 0.5 to 6 cc per 1 g of the theoretically obtained ITO, and the sedimentation is that filled with solid contents in high density.

Then, solid-liquid separation by filtration and the like is conducted and the precipitate containing indium and tin after aging is collected. The filtering method is not specifically limited, and examples thereof include methods such as suction filtration, filter press and the like.

Since salts such as ammonium salts (e.g. ammonium chloride, ammonium nitrate, etc.) and alkaline metal salts (e.g. sodium chloride, sodium nitrate, etc.) which are produced by reacting indium salt and tin salt with the aqueous alkaline solution as a by-product, are adhered to the precipitate containing indium and tin after solid-liquid separation by filtration, it is necessary to wash the precipitate.

Particularly, even if the ITO powder obtained by calcining the precipitate-containing indium and tin to which a large amount of ammonium chloride is adhered is subjected to a dechlorination treatment by washing described hereinafter, an ITO powder containing a large amount of chlorine contents is obtained, and a high-density ITO sintered body having a relative density of larger than 90% is not obtained.

As the washing solvent, there can be used water (e.g. distilled water, deionized water, etc.) or aqueous ammonia, which dissolves the salts as the by-product. It is preferred to use ammonia as the washing solvent because it has an effect of reducing the washing time. In this case, the pH of aqueous ammonia is preferably from 8 to 12, more preferably from 9 to 11. When washing is conducted using aqueous ammonia having the pH of larger than 12, the precipitate containing indium and tin is likely to be dissolved again and, therefore, a decrease in yield of the final ITO powder and deviation of the composition of tin oxide in the ITO powder from the charge composition are likely to arise.

Then, the precipitate containing indium and tin after solid-liquid separation and further washing is calcined. The precipitate containing indium and tin after solid-liquid separation and further washing is preferably dried as a preliminary step of calcination. The drying method is not specifically limited, and examples thereof include a method of heating at the temperature at which water adhered to the precipitate containing indium and tin can be removed, for example, about 90° C. or more and 200° C. or less.

The dried material obtained is preferably deagglomerated. As the sedimentation volume of the precipitate obtained by supplying the aqueous mixed solution of the indium salt and tin salt, followed by reacting, becomes smaller, a degree of agglomeration among primary particles in the finally obtained ITO powder becomes weak by deagglomeration. The dried material can be easily deagglomerated because a degree of agglomeration is weak even if the dried materials are agglomerated. The deagglomerating method is not specifically limited, and examples thereof include methods such as ball mill, atomizer deagglomeration and the like.

Then, the dried material of the precipitate containing indium and tin obtained by the above method is calcined to give an ITO powder.

It is necessary that the calcining temperature is 600° C. or more and 1300° C. or less, preferably 800° C. or more and 1200° C. or less. When the calcining temperature is less than 600° C., decomposition of the remained salt adhered to the precipitate containing indium and tin is insufficient and the primary particle size of the obtained ITO is small and, therefore, a degree of agglomeration among primary particles in the ITO powder arise drastically and an uniform high-density molded body can not be obtained. As a result, the sintered body after sintering causes a problem such as crack, fracture, warpage and the like.

When the calcining temperature exceeds 1300° C., the primary particles of ITO grow and a part of them agglomerate and, therefore, a driving force to sintering becomes small and an ITO powder having good sintering properties can not be obtained.

As the atmosphere for calcination, it is preferred to use air, oxygen, nitrogen or hydrogen halide gas (e.g hydrogen chloride, hydrogen bromide, hydrogen iodide, etc.) or halogen gas (e.g. chlorine, bromine, iodine, etc.). The calcination in the atmosphere containing the hydrogen halide gas or halogen gas is preferred and the calcination in the atmosphere containing the hydrogen chloride gas is particularly preferred. When the calcination is performed in the atmosphere containing the hydrogen chloride gas, a degree of agglomeration among primary particles in the ITO powder becomes weakest.

When the dried material of the precipitate is calcined in the atmosphere containing the hydrogen halide gas or halogen gas, particularly atmosphere containing the hydrogen chloride gas, the dried material is calcined in the atmosphere containing the hydrogen halide gas or halide gas in the content of preferably 1% by volume or more, more preferably 5% by volume or more, most preferably 10% by volume or more, based on the total volume of the atmosphere. The upper limit of the concentration of the hydrogen halide gas or halide gas is not specifically limited, and is preferably 70% by volume or less, more preferably 50% by volume or less, most preferably 40% by volume or less, in view of the industrial productivity. As a gas used for diluting the hydrogen halide gas or halide gas, for example, inert gas (e.g. argon, etc.), nitrogen, oxygen, air or a mixed gas thereof can be used.

The atmosphere gas containing the hydrogen halide gas or halogen gas, particularly atmosphere containing the hydrogen chloride gas is preferably introduced at 600° C. or more. When the atmosphere gas containing the hydrogen chloride gas is introduced at the temperature lower than 600° C., loss by volatilization of ITO may become large and a problem such as decrease in yield may arise. After calcining at the predetermined temperature for the predetermined time, supply of the atmosphere gas containing the hydrogen chloride gas is stopped and the atmosphere gas containing inert gas (e.g. argon, etc.), nitrogen, oxygen, air or a mixed gas thereof is supplied, followed by cooling.

The pressure of the atmosphere in which the calcination is performed is not specifically limited, and can be optionally selected within the range which is industrially used.

The calcining time is not specifically limited because it depends on the concentration of the atmosphere gas and calcining temperature, and is preferably 1 minute or more, more preferably 10 minutes or more.

The source of supply and supplying method of the atmosphere gas are not specifically limited. It is preferred that the above atmosphere gas can be introduced into the reaction system wherein the raw material containing indium and tin are present.

The type of a calcining apparatus is not specifically limited, and a so-called calcining furnace can be used. Particularly, when using the hydrogen halide gas or halogen gas, the calcining furnace is preferably made of a material which is not corroded with the halogen halide gas or halogen gas. Furthermore, the calcining furnace desirably has a mechanism for adjusting the atmosphere. The calcining furnace is preferably an airtight one when the corrosive gas such as hydrogen halide gas or halogen gas is used.

It is preferred to calcine by a continuous manner in the industrial point of view, for example, a tunnel furnace can be used. When calcining in a corrosive atmosphere, the apparatus, crucible and boat used in the calcining step are preferably made of alumina, quartz, acid-resistant brick or graphite.

The ITO powder thus produced by the above method is composed of fine primary particles wherein a particle size calculated from the BET specific surface area is preferably 0.05 μm or more and 1 μm or less, more preferably 0.1 μm or more and 0.5 μm or less. A 50% diameter in a cumulative particle size distribution (average agglomerated particle size) becomes 1 μm or more according to the reaction condition for obtaining the precipitate containing indium and tin and, therefore, a high-density ITO sintered body having a relative density of larger than 90%, preferably larger than 95%, cannot be obtained sometimes. In this case, the ITO powder after calcination is preferably deagglomerated.

The deagglomerating method of the ITO powder is not specifically limited, and examples thereof include deagglomerating methods by vibration mill, ball mill, jet mill and the like, which are normally used for the industry. As the deagglomerating method of the ITO powder of the present invention, slight deagglomeration (e.g. deagglomeration by ball mill, jet mill, etc.) can be utilized because a degree of agglomeration among primary particles in the ITO powder is weak. In case of the ball mill deagglomeration, the dry or wet deagglomeration or a combination thereof can be used.

As the vessel or ball for deagglomeration used for deagglomerating the ITO powder, a vessel made of alumina or a resin can be used as the container for deagglomeration and a ball made of alumina, zirconia or a resin can be used as the ball for deagglomeration. In case of the ball mill deagglomeration, it is preferred to use a vessel made of a resin as the vessel for deagglomeration and a zirconia ball having high wear resistance as the ball for deagglomeration, contamination from the vessel and balls for deagglomeration in case of the ball mill deagglomeration being little.

When the hydrogen halide gas or halogen gas is particularly used as the atmosphere gas in case of calcination, a large amount of the halogen content is sometimes remained in the ITO powder after calcination. When the residual amount of chlorine is particularly large, a high-density sintered body having a relative density of larger than 90%, preferably larger than 95%, can not be obtained sometimes. In this case, the residual amount of chlorine can be reduced to preferably 0.2% by weight or less, more preferably 0.1% by weight or less, by washing the ITO powder after calcining or calcining and further deagglomeration with water or an aqueous alkaline solution, or heat-treating the ITO powder in an atmosphere containing 0.1% by volume or more of at least one gas selected from the group consisting of water vapor and oxygen at 600° C. or more and 1300° C. or less, or using the above treatments in combination.

The ITO power produced by the above method is an easily sinterable ITO powder wherein a particle size calculated from the BET specific surface area is 0.05 μm or more and 1 μm or less, preferably 0.1 μm or more and 0.5 μm or less, a 50% diameter in a cumulative particle size distribution is 1 μm or less and a content of halogen is 0.2% by weight or less, preferably 0.1% by weight or less, which makes it possible to obtain a high-density sintered body having a relative density of 90% or more, preferably 95% or more.

Then, the ITO powder obtained by the above method is molded to impart a specific form such as plate, disk and the like, and then sintered. The molding method is not specifically limited, and examples thereof include uniaxial pressure molding, cold isostatic pressing (hereinafter referred to as "CIP"), slipcast molding, filter press molding, extrusion molding, injection molding and the like. The above molding methods may be used alone or in combination thereof.

It is necessary that the sintering temperature is 1450° C. or more and 1650° C. or less. When the sintering temperature is less than 1450° C., a sintered body having a relative density of 90% or more, preferably 95% or more, is not obtained and solid solution of the tin oxide into the indium oxide is insufficient. On the other hand, when the sintering temperature exceeds 1650° C., the grain growth in the ITO sintered body occurs and the strength of the obtained ITO sputtering target is lowered.

The sintering is preferably conducted in the atmosphere containing an oxygen gas of normal pressure (e.g. air, etc.), more preferably pure oxygen atmosphere. The pure oxygen atmosphere means the atmosphere containing the oxygen gas and an avoidable impurity gas. When sintering in the atmosphere containing no oxygen gas (e.g. nitrogen gas, argon gas, etc.), the indium oxide or tin oxide in the ITO is sometimes dissociated into indium, tin and oxygen gas.

According to the method for producing the ITO sintered body of the present invention, a high-density ITO sintered body having a relative density of 90% or more, preferably 95% or more, can be obtained. When using this sintered body as the sputtering, decrease in the formation of nodule, improvement in sputtering efficiency, decreased in the formation of particles decreased in abnormal discharge, realization of high-quality ITO thin film and the. like can be expected.

According to the present invention, it becomes possible to produce an ITO powder which is superior in sintering properties, capable of producing a high-density sintered body densified to 90% or more, more preferably 95% or more, of the theoretical density. The ITO powder of the present invention is suitable as application for transparent conductive filler.

When the ITO powder of the present invention is used as a raw material for the production of an ITO sintered body, a high-density ITO powder sintered body is obtained. When the ITO sintered body is used as a sputtering target, the sputtering efficiency can be improved.

EXAMPLES

The present invention will now be illustrated by means of the following Examples, which should not be construed as a limitation upon the scope of the invention.

In the Examples, the measurement of various properties was conducted in the following way.

1. Measurement of a 50% diameter in a cumulative particle size distribution and a BET specific surface area of ITO powder after calcination (1) A 50% diameter in a cumulative particle size distribution was measured using a centrifugal sedimentation type particle size distribution analyzer (SACP-2, manufactured by Shimadzu Corporation) based on the principle of light transmission method).

(2) A BET specific surface area was measured using a FLOWSORB-II, 2300 (manufactured by Micromelitics).

A particle size was decided from the BET specific surface area (D BET) calculated by the following equation:

$$D\ BET\ (\mu m) = 6/(S*\rho)$$

[wherein S is a BET specific surface area ($m^2/g$) and $\rho$ is an ITO theoretical density ($g/cm^3$)] and was taken as a measure of a primary particle size.

In case of ITO containing 10% by weight of tin oxide, the value of the ITO theoretic density was determined by using the theoretical density of indium oxide (7.18 $g/cm^3$) and that of tin oxide (6.95 $g/cm^3$) according to the following calculation equation to give 7.16 $g/cm^3$.

7.18 $g/cm^3$ (density of indium oxide)×0.9 (content)+6.95 $g/cm^3$ (density of tin oxide)×0.1 (content)=7.16 $g/cm^3$ (density of ITO)

2. Measurement of content of tin oxide in ITO powder after calcination

The content of tin was measured by emission spectroscopic analysis, and the content of tin is converted to the content of tin oxide.

3. Measurement of content of chlorine in ITO powder

The content of chlorine was determined by the silver nitrate titration methods.

4. Measurement of density of sintered body

The density of the sintered body was measured by the Archimedes method according to the measuring method of JIS R 2205-1992.

As the theoretical density value of the ITO sintered body, which is used for calculating the relative density of the sintered body, 7.16 $g/cm^3$ was used in case of ITO containing 10% by weight of tin oxide.

An aqueous mixed solution of an indium salt and a tin salt was prepared by the following three kinds of methods so that the content of tin oxide in the finally obtained ITO powder becomes 10% by weight.

1. Aqueous mixed solution A of indium salt and tin salt

An aqueous solution (200 ml) was collected from an aqueous indium salt solution, which was obtained by dissolving metal indium (purity: 99.99%, 57.40 g) in an aqueous 6N-hydrochloric acid solution, followed by diluting with deionized water to make 1 liter, and an aqueous solution (21 ml) was collected from an aqueous tin salt solution, which was obtained by dissolving metal tin (purity: 99.99%, 6.21 g) in an aqueous concentrated hydrochloric acidsolutiontomake 100 ml. Then, these solutions were mixed to prepare an aqueous mixed solution (221 ml) of the indium salt and tin salt.

The concentration of indium and tin in the aqueous mixed solution of the indium salt and tin salt is as follows. That is, the concentration of In is 51.95 g/l and that of Sn is 5.91 g/l.

2. Aqueous mixed solution B of indium salt and tin salt

An aqueous solution (106 ml) was collected from an aqueous indium salt solution, which was obtained by dissolving metal indium (57.40 g) in an aqueous concentrated hydrochloric acid solution to make 120 ml, and an aqueous solution (90 ml) was collected from an aqueous tin salt solution, which was obtained by dissolving metal tin (5.81 g) in an aqueous concentrated hydrochloric acid solution to make 93 ml. Then, these solutions were mixed to prepare an aqueous mixed solution (196 ml) of the indium salt and tin salt.

The concentration of indium and tin in the aqueous mixed solution of the indium salt and tin salt is as follows. That is, the concentration of In is 258.69 g/l and that of Sn is 28.68 g/l.

3. Aqueous mixed solution C of indium salt and tin salt

An aqueous indium salt solution was obtained by dissolving metal indium (252.60 g) in an aqueous concentrated hydrochloric acid solution to make 680 ml, and an aqueous solution (117 ml) was collected from an aqueous tin salt solution, which was obtained by dissolving metal tin (53.95 g) in an aqueous concentrated hydrochloric acid solution to make 230ml. Then, these solutions were mixed and aqueous concentrated ammonia (63 ml) was added to prepare an aqueous mixed solution (860 ml) of the indium salt and tin salt.

The concentration of indium and tin in the aqueous mixed solution of the indium salt and tin salt is as follows. That is, the concentration of In is 293.72 g/l and that of Sn is 31.91 g/l.

The precipitate containing indium and tin was calcined by the following two kinds of methods.

1. Calcination method A

A precipitate containing indium and tin as a raw material was dried at 110° C. and then charged in an alumina or quartz boat. A charged amount of the dried material of precipitate was about 2 to 18 g and a charging depth was about 10 mm. The calcination was conducted in a cylindrical furnace (MS electric furnace, manufactured by Motoyama Co., Ltd.) having a quartz muffle (diameter: 58 mm, length: 1200 mm). A heating rate was 10° C./minute up to 900° C. and 5° C./minute up to 1100° C.

As the atmosphere gas, only air was allowed to flow from room temperature to 1000° C. At the temperature higher than 1000° C., a hydrogen chloride gas having a predetermined concentration was allowed to flow. The concentration of the atmosphere gas was adjusted by controlling the flow rate of the gas using a flow meter. As the gas used for diluting the hydrogen chloride gas, air was used and the linear flow velocity of the atmosphere gas flow rate was adjusted to about 10 cm/minute.

As the hydrogen chloride gas, a bomb hydrogen chloride (purity: 99.9%, manufactured by Tsurumi Soda Co., Ltd.) was used.

After the temperature reached the predetermined temperature, the material was maintained at the same temperature for a predetermined period of time. The desired ITO powder was obtained in the alumina boat wherein the dried precipitate containing indium and tin as the raw material was charged, after passage of the predetermined maintaining time and air cooling with flowing only air.

2. Calcination method B

A precipitate containing indium and tin as a raw material was dried at 11° C. and then charged in a quartz boat. A charged amount of dried material of precipitate was about 360 g and a charging depth was about 10 mm. The calcination was conducted in a high-temperature box electric furnace (manufactured by Morisawa Riko Co., Ltd.) into which a quartz muffle (diameter: 160 mm, length: 1600 mm) is inserted. A heating rate was 5° C./minute up to 1100° C. The other operation was the same as that of the above Calcination method A.

The ITO powder obtained by calcination was washed with water for the purpose of performing dechlorination, dried, optionally subjected to a deagglomeration treatment and molded, and then sintering properties thereof were evaluated. The washing method of the ITO powder with water comprises charging 5 to 10 g of the ITO powder after calcination into 500 ml of deionized water or charging 280 q of the ITO powder after calcination into 3000 ml of deionized water, stirring for 30 minutes, filtering the solution by means of suction, and repeating washing with deionized water until no chlorine ion was detected when an aqueous solution of silver nitrite was dropped in waste water.

The ITO powder was deagglomerated by the following two kinds of methods.

1. Dry deagglomeration

The ITO powder (5 g) and zirconia balls (500 g) having a diameter of 5 mm were charged in a 500 ml polyethylene pot, and then the ITO powder was deagglomerated using a ball mill at 60 rpm for 6 hours.

2. Wet deagglomeration

The ITO powder (250 g), zirconia balls (3500 g) having a diameter of 5 mm and ethanol (500 ml) were charged in a 2 liter polyethylene pot, and then the ITO powder was deagglomerated using a ball mill at 100 rpm for 6 hours and dried under reduced pressure by using a rotary evaporator.

The resultant powder was subjected to uniaxial pressure molding at 100 kg/cm$^2$ and then subjected to CIP molding under the pressure of 3 ton/cm$^2$. The sintering was conducted using an ultrahigh-temperature heat treating furnace (manufactured by Shinsei Denro Co., Ltd.). First, the interior of the furnace in which the molded body was charged was evacuated using a vacuum pump, and then the pressure was returned to a normal pressure by introducing an oxygen gas, thereby substituting the interior of the furnace with an oxygen gas atmosphere. Then, the molded body was sintered with flowing an oxygen gas under a normal pressure at 1500 to 1600° C. for 10 hours to obtain an ITO sintered body. The heating rate was 20° C./minute.

Example 1

400 ml of water whose pH was adjusted to 4.5 by adding aqueous dilute hydrochloric acid solution to deionized water was charged in a 1 liter beaker and then maintained at 60° C. With stirring this deionized water (pH=4.5, 60° C.), an aqueous mixed solution A of an indium salt and a tin salt and aqueous 12.5% ammonia were simultaneously supplied over 35 minutes so as to maintain the PH during the reaction at 4.5. The pH has been changed within the range from 3.0 to 5.2 for 2 minutes since the beginning of the reaction. After two minutes since the beginning of the reaction, the reaction was conducted with maintaining the pH within the range from 4.4 to 4.6 to form a precipitate containing indium and tin.

After the completion of the reaction, the resultant solution was stirred at 60° C. for 30 minutes, allowed to stand at 60° C. for 6 hours and then allowed to stand at room temperature for 14 hours to age the precipitate. The sedimentation volume of the precipitate after aging was 3.5 cc per 1 g of theoretically obtained ITO.

The precipitate was collected by suction filtration [using Buchner type funnel having an inner diameter of about 76 mm (filter funnel, Buchner type, manufactured by Nikkato Co., Ltd.), quantitative filter paper (quantitative filter paper No. 5C, manufactured by Advantec Toyo Co., Ltd.) and aspirator (HANDY ASPIRATOR, manufactured by Yamato Kagaku Co., Ltd.)], and then washed ten times with about 120 ml of deionized water. The time required for filtration and washing was one hour, and its filterability was excellent and the operation was extremely easy. This precipitate was dried at 110° C. As a result, the dried material was easily deagglomerated.

The dried material was calcined at 1100° C. for 30 minutes with flowing 20% by volume of a hydrogen chloride gas (diluted with air) from 1000° C. according to the calcination method A, washed with water and then dried to obtain an ITO powder.

The obtained ITO powder was that wherein a content of tin oxide is 9.9% by weight, a BET specific surface area is 8.2 m$^2$/g, a particle size calculated from the BET specific surface area is 0.10 $\mu$m and a 50% diameter in a cumulative particle size distribution is 0.33 $\mu$m. The ITO powder was observed using a scanning electron microscope (JSM-T220 Model, manufactured by Nippon Denshi Co., Ltd.). As a result, a primary particle size in the ITO powder was about 0.1 $\mu$m and a degree of agglomeration among primary particles was weak.

Example 2

400 ml of water whose pH was adjusted to 4.5 by adding aqueous dilute hydrochloric acid solution to deionized water was charged in a 1 liter beaker and then maintained at 60° C. With stirring this deionized water (pH=4.5, 60° C.), an aqueous mixed solution B of an indium salt and a tin salt and aqueous 12.5% ammonia were simultaneously supplied over 69 minutes so as to maintain the pH during the reaction at 4.5. The pH has been changed within the range from 3.1 to 5.4 for 2 minutes since the beginning of the reaction. After two minutes since the beginning of the reaction, the reaction was conducted with maintaining the pH within the range from 4.4 to 4.6 to form a precipitate containing indium and tin.

After the completion of the reaction, the resultant solution was stirred at 60° C. for 30 minutes, allowed to stand at 60° C. for 6 hours and then allowed to stand at room temperature for 14hours to age the precipitate. The sedimentation volume of the precipitate after aging was 1.3 cc per 1 g of theoretically obtained ITO.

The precipitate was collected by suction filtration (using Buchner type funnel having an inner diameter of about 135 mm, quantitative filter paper No. 5C and aspirator), and then washed ten times with about 120 ml of deionized water. The time required for filtration and washing was one hour, and its filterability was excellent and the operation was extremely easy. This precipitate was dried at 110° C. As a result, the dried material was easily deagglomerated.

The dried material was calcined at 1100° C. for 30 minutes with flowing 20% by volume of a hydrogen chloride gas (diluted with air) from 1000° C. according to the calcination method A, washed with water and then dried to obtain an ITO powder.

The obtained ITO powder was that wherein a content of tin oxide is 10.5% by weight, a BET specific surface area is 6.1 $m^2/g$, a particle size calculated from the BET specific surface area is 0.14 $\mu$m and a 50% diameter in a cumulative particle size distribution is 1.1 $\mu$m. The ITO powder was observed using a scanning electron microscope. As a result, a primary particle size in the obtained ITO powder was about 0.1 $\mu$m and a degree of agglomeration among primary particles was weak.

The powder was subjected to a dry deagglomeration treatment to obtain an ITO powder wherein a BET specific surface area is 8.7 $m^2/g$, a particle size calculated from the BET specific surface area is 0.10 $\mu$m and a 50% diameter in a cumulative particle size distribution is 0.39 $\mu$m.

Example 3

According to the same manner as that described in Example 1 except for simultaneously supplying an aqueous mixed solution A of an indium salt and a tin salt and aqueous 12.5% ammonia over 36 minutes so as to maintain the pH during the reaction at 5.0, an ITO powder was obtained.

The pH has been changed within the range from 3.5 to 6.7 for 2 minutes since the beginning of the reaction. After two minutes since the beginning of the reaction, the reaction was conducted with maintaining the pH within the range from 4.5 to 5.5.

After the completion of the reaction, the resultant solution was stirred at 60° C. for 30 minutes, allowed to stand at 60° C. for 6 hours and then allowed to stand at room temperature for 14 hours to age the precipitate. The sedimentation volume of the precipitate after aging was 4.6 cc per 1 g of theoretically obtained ITO.

The precipitate was collected by suction filtration (using Buchner type funnel having an inner diameter of about 76 mm, quantitative filter paper No. 5C and aspirator), and then washed ten times with about 120 ml of deionized water. The time required for filtration and washing was one hour, and its filterability was excellent and the operation was extremely easy. This precipitate was dried at 110° C. As a result, the dried material was easily deagglomerated.

IFS The dried material was calcined at 1100° C. for 30 minutes with flowing 20% by volume of a hydrogen chloride gas (diluted with air) from 1000° C. according to the calcination method A, washed with water and then dried.

The ITO powder obtained by calcination was that wherein a BET specific surface area is 8.1 $m^2/g$, a particle size calculated from the BET specific surface area is 0.10 $\mu$m and a 50% diameter in a cumulative particle size distribution is 0.40 $\mu$m. The ITO powder was observed using a scanning electron microscope. As a result, a primary particle size in the obtained ITO powder was about 0.1 $\mu$m and a degree of agglomeration among primary particles was weak.

Example 4

The powder obtained in Example 3 was calcined in air at 1100° C. for 30 minutes without flowing a hydrogen chloride gas. The ITO powder obtained by calcination was that wherein a BET specific surface area is 7.3 $m^2/g$, a particle size calculated from the BET specific surface area is 0.11 $\mu$m and a 50% diameter in a cumulative particle size distribution is 0.50 $\mu$m. The ITO powder was observed using a scanning electron microscope. As a result, a primary particle size in the obtained ITO powder was about 0.1 $\mu$m and a degree of agglomeration among primary particles was weak.

Example 5

2000 ml of water whose pH was adjusted to 5.0 by adding aqueous dilute hydrochloric acid solution to deionized water was charged in a 5 liter beaker and then maintained at 60° C. With stirring this water (pH=5.0, 60° C.), an aqueous mixed solution C of an indium salt and a tin salt and aqueous 12.5% ammonia were simultaneously supplied over 84 minutes so as to maintain the pH during the reaction at 5.0.

The pH has been changed within the range from 3.6 to 5.5 for 2 minutes since the beginning of the reaction. After two minutes since the beginning of the reaction, the reaction was conducted with maintaining the pH within the range from 4.8 to 5.2 to form a precipitate containing indium and tin.

After the completion of the reaction, the resultant. solution was stirred at 60° C. for 30 minutes, allowed to stand at 60° C. for 6 hours and then allowed to stand at room temperature for 14 hours to age the precipitate. The sedimentation volume of the precipitate after aging was 1.1 cc per 1 g of theoretically obtained ITO.

After aqueous concentrated ammonia was added to adjust the pH to 8.5 with stirring the suspension containing the precipitate after aging again, the precipitate was collected by suction filtration (using Buchner type funnel having an inner diameter of about 195 mm, quantitative filter paper No. 5C and aspirator) and washed five times with about 2 liter of aqueous dilute ammonia whose pH was adjusted to 10 by adding aqueous ammonia to deionized water. The time required for filtration and washing was 25 minutes, and its filterability was excellent and the operation was extremely easy. This precipitate was dried at 110° C. As a result, the dried material was easily deagglomerated.

The dried material was calcined at 1100° C. for 40 minutes with flowing 20% by volume of a hydrogen chloride gas (diluted with air) from 1000° C. according to the calcination method B, washed with water and then dried to obtain an ITO powder.

The obtained ITO powder was that wherein a BET specific surface area is 3.3 $m^2/g$, a particle size calculated from the BET specific surface area is 0.25 $\mu$m and a 50% diameter in a cumulative particle size distribution is 2.6 $\mu$m. The ITO powder was observed using a scanning electron microscope. As a result, a primary particle size in the ITO powder was about 0.1 to 0.2 $\mu$m and a degree of agglomeration among primary particles was weak.

The powder was subjected to a wet deagglomeration treatment to obtain an ITO powder wherein a BET specific surface area is 5.1 $m^2/g$, a particle size calculated from the BET specific surface area is 0.16 $\mu$m and a 50% diameter in a cumulative particle size distribution is 0.48 $\mu$m. A content of chlorine in the ITO powder was 0.05% or less by weight.

Example 6

According to the same manner as that described in Example 5 except that 2000 ml of water whose pH was adjusted to 5.0 by adding aqueous dilute hydrochloric acid solution to deionized water was charged in a 5 liter beaker and then maintained at 50° C. and that an aqueous mixed solution C of an indium salt and a tin salt and aqueous 12.5% ammonia were simultaneously supplied over 81 minutes so as to maintain the pH during the reaction at 5.0 with stirring this water (pH=5.0, 50° C.), an ITO powder was obtained.

The pH has been changed within the range from 3.6 to 6.5 for 2 minutes since the beginning of the reaction. After two minutes since the beginning of the reaction, the reaction was conducted with maintaining the pH within the range from 4.8 to 5.3 to form a precipitate containing indium and tin.

After the completion of the reaction, the resultant solution was stirred at 60° C. for 30 minutes, allowed to stand at 60° C. for 6 hours and then allowed to stand at room temperature for 14 hours to age the precipitate. The sedimentation volume of the precipitate after aging was 1.7 cc per 1 g of theoretically obtained ITO.

After aqueous concentrated ammonia was added to adjust the pH to 8.6 with stirring the suspension containing the precipitate after aging again, the precipitate was collected goby suction filtration (using Buchner type funnel having an inner diameter of about 195 mm, quantitative filter paper No. 5C and aspirator) and washed five times with about 2 liter of dilute aqueous ammonia whose pH was adjusted to 10 by adding aqueous ammonia to deionized water. The time required for filtration and washing was 30 minutes, and its filterability was excellent and the operation was extremely easy. This precipitate was dried at 110° C. As a result, the dried material was easily deagglomerated.

The dried material was calcined by the calcination method B, washed with water and then dried to obtain an ITO powder, which was that wherein a BET specific surface area is 3.2 m$^2$/g, a particle size calculated from the BET specific surface area is 0.26 μm and a 50% diameter in a cumulative particle size distribution is 2.8 μm. The ITO powder was observed using a scanning electron microscope. As a result, a primary particle size in the ITO powder was about 0.1 to 0.2 μm and a degree of agglomeration among primary particles was weak.

The powder was subjected to a wet deagglomeration treatment to obtain an ITO powder wherein a BET specific surface area is 5.1 m$^2$/g, a particle size calculated from the BET specific surface area is 0.16 μm and a 50% diameter in a cumulative particle size distribution is 0.52 μm.

Example 7

The ITO powder wherein a content of tin oxide is 9.9% by weight, a particle size calculated from the BET specific surface area is 0.1 μm and a 50% diameter in a cumulative particle size distribution is 0.33 μm, which was obtained in Example 1, was molded into a disk form having a diameter of 10 mm, which was then sintered at 1600° C. for 10 hours. As a result, an ITO sintered body, which has a density of 7.09 g/cm$^3$ and is densified to 99.1% of the theoretical density, was obtained.

Example 8

The ITO powder wherein a content of tin oxide is 9.9% by weight, a particle size calculated from the BET specific surface area is 0.1 μm and a 50% diameter in a cumulative particle size distribution is 0.33 μm, which was obtained in Example 1, was molded into a disc form having a diameter of 10 mm, which was then sintered at 1500° C. for 10 hours. As a result, an ITO sintered body, which has a density of 7.06 g/cm$^3$ and is densified to 98.5% of the theoretical density, was obtained.

Example 9

The ITO powder wherein a content of tin oxide is 10.5% by weight, a particle size calculated from the BET specific surface area is 0.1 μm and a 50% diameter in a cumulative particle size distribution is 0.39 μm, which was obtained in Example 2, was molded into a disk form having a diameter of 10 mm, which was then sintered at 1600° C. for 10 hours. As a result, an ITO sintered body, which has a density of 7.06 g/cm$^3$ and is densified to, 98.6% of the theoretical density, was obtained.

Example 10

The ITO powder wherein a particle size calculated from the BET specific surface area is 0.16 μm and a 50% diameter in a cumulative particle size distribution is 0.48 μm, which was obtained in Example 5, was molded into a disk form having a diameter of 90 mm, which was then sintered at 1600° C. for 10 hours. As a result, an ITO sintered body, which has a density of 7.15 g/cm$^3$ and is densified to 99.8% of the theoretical density, was obtained.

Example 11

The ITO powder wherein a particle size calculated from the BET specific surface area is 0.16 μm and a 50% diameter in a cumulative particle size distribution is 0.52 μm, which was obtained in Example 6, was molded into a disk form having a diameter of 20 mm, which was then sintered at 1600° C. for 10 hours. As a result, an ITO sintered body, which has a density of 7.15 g/cm$^3$ and is densified to 99.8% of the theoretical density, was obtained.

Comparative Example 1

400 ml of water whose pH was adjusted to 7.3 by adding aqueous dilute ammonia to deionized water was charged in a 1 liter beaker and then maintained at 60° C. With stirring this water (pH=7.3, 60° C.), an aqueous mixed solution A of an indium salt and a tin salt and aqueous 25% ammonia were simultaneously supplied over 39 minutes so as to maintain the pH during the reaction at 7.3. The pH has beenchanged within the range from 3.0 to 7.8 for 3 minutes since the beginning of the reaction. After three minutes since the beginning of the reaction, the reaction was conducted with maintaining the pH within the range from 7.0 to 7.4 to form a precipitate containing indium and tin.

After the completion of the reaction, aging was conducted according to the same manner as that described in Example 1. As a result, the sedimentation volume of the precipitate after aging was 11 cc per 1 g of theoretically obtained ITO.

According to the same manner as that described in Example 1, the precipitate was collected by suction filtration and washed three times with about 120 ml of deionized water. The time required for filtration and washing was 9 hours, and it was difficult to conduct the filtering operation. This precipitate after washing was dried at 110° C. As a result, the dried material became a hard agglomerated mass, which was not easily deagglomerated.

Comparative Example 2

According to the same manner as that described in Example 1 except for adjusting the temperature of water in the reaction vessel and aging temperature to 28° C., a precipitate containing indium and tin was obtained.

The sedimentation volume of the precipitate after aging was 8.7 cc per 1 g of theoretically obtained ITO.

According to the same manner as that described in Example 1, the precipitate was collected by suction filtration. As a result, the time required for only filtration was 7 hours, and it was very difficult to conduct the filtering operation. This precipitate was dried at 110° C. As a result, the dried material became an drastically strong mass, which was not easily deagglomerated.

Comparative Example 3

The ITO powder wherein a content of tin oxide is 10.5% by weight, a BET specific surface area is 6.1 m²/g, a particle size calculated from the BET specific surface area is 0.14 μm and a 50% diameter in a cumulative particle size distribution is 1.1 μm, which was obtained in Example 2, was molded into a disk form having a diameter of 10 mm, which was then sintered at 1600° C. for 10 hours. As a result, the obtained sintered body has a density of 6.34 g/cm³ and was densified to no more than 88.5% of the theoretical density.

Comparative Example 4

The precipitate obtained according to the same manner as that described in Example 5 was collected by suction filtration and washed three times with about 2 liter of an aqueous 2 wt % ammonium chloride solution. The time required for filtration and washing was 23 minutes, and filtering characteristics were excellent and the operation was extremely easy. This precipitate was dried at 110° C. As a result, the dried material was easily deagglomerated.

The dried material to which ammonium chloride was adhered was calcined at 1100° C. for 30 minutes with flowing 20% by volume of a hydrogen chloride gas (diluted with air) from 1000° C. according to the calcination method A, washed with water and then dried to obtain an ITO powder.

The obtained ITO powder was that wherein a BET specific surface area is 3.8 m²/g, a particle size calculated from the BET specific surface area is 0.22 μm and a 50% diameter in a cumulative particle size distribution is 1.2 μm. The ITO powder was observed using a scanning electron microscope. As a result, a primary particle size in the ITO powder was about 0.1 to 0.2 μm and a degree of agglomeration among primary particles was weak. The powder was subjected to a dry deagglomeration treatment to obtain an ITO powder wherein a BET specific surface area is 7.4 m²/g, a particle size calculated from the BET specific surface area is 0.11 μm and a 50% diameter in a cumulative particle size distribution is 0.43 μm. A content of chlorine in the ITO powder was 0.28% by weight.

The ITO powder subjected to dry deagglomeration was molded into a disk form having a diameter of 20 mm, which was then calcined at 1600° C. for 10 hours. As a result, the obtained sintered body has a density of 6.06 g/cm³ and was densified to no more than 84.7 of the theoretical density.

Comparative Example 5 (coprecipitation method)

According to the same manner as that described in Example 1 except for adding dropwise aqueous 25% ammonia to an aqueous mixed solution A of an indium salt and a tin salt, heated to 60° C., to adjust the final pH to 7.2, an ITO powder was obtained.

The sedimentation volume of the precipitate after aging was 2.3 cc per 1 g of theoretically obtained ITO.

According to the same manner as that described in Example 1, the precipitate was collected by suction filtration and washed ten times with about 120 ml of deionized water. The time required for filtration and washing was one hour, and its filterability was excellent and the operation was extremely easy. This precipitate was dried at 110° C. As a result, the dried material was easily deagglomerated.

The dried material was calcined at 1100° C. for 30 minutes with flowing 20% by volume of a hydrogen chloride gas (diluted with air) from 1000° C. according to the calcination method A, washed with water and then dried to obtain an ITO powder.

The obtained ITO powder was that wherein a BET specific surface area is 4.8 m²/g, a particle size calculated from the BET specific surface area is 0.17 μm and a 50% diameter in a cumulative particle size distribution is 1.2 μm. The ITO powder was observed using a scanning electron microscope. As a result, a primary particle size in the ITO powder was about 0.1 to 0.2 μm and formed agglomerated particles wherein primary particles are strongly sticked each other.

What is claimed is:

1. An indium oxide-tin oxide powder wherein a content of tin oxide is from 2 to 20% by weight, a particle size calculated from the BET specific surface area and the theoretical density of indium oxide-tin oxide is from 0.1 μm or more to 0.5 μm or less, an average agglomerated particle size is 1 μm or less and a content of halogen is 0.1% by weight or less, wherein the powder is capable of being sintered to form a sintered body having a relative density of 95% or more.

2. An indium oxide-tin oxide powder wherein a content of tin oxide is from 2 to 20% by weight, a particle size calculated from the BET specific surface area and theoretical density of indium oxide-tin oxide is from 0.1 μm or more to 0.5 μm or less, an average agglomerated particle size is 1 μm or less and a content of halogen is 0.1% by weight or less, wherein the powder is capable of being sintered to form a sintered body having a relative density of 95% or more, which is produced by a method which comprises supplying to react an aqueous solution of an indium salt, an aqueous solution of a tin salt and an aqueous alkaline solution into water at 40° C. or more and less than 100 ° C. so that the pH during the reaction is maintained within the range from 4 to 6, forming a precipitate, washing the formed precipitate after solid-liquid separation, and calcining the precipitate at 600° C. or more and 1300° C. or less.

3. An indium oxide-tin powder wherein a content of tin oxide is from 2 to 20% by weight, a particle size calculated from the BET specific surface area and the theoretical density of indium oxide-tin oxide is from 0.1 μm or more to 0.5 μm or less, an average agglomerated particle size is 1 μm or less and a content of halogen is 0.1% by weight or less, wherein the powder is capable of being sintered to form a sintered body having a relative density of 95% or more, which is produced by a method which comprises supplying to react an aqueous mixed solution of an indium salt and tin salt and an aqueous alkaline solution into water at 40° C. or more and less than 100° C. so that the pH during the reaction is maintained within the range from 4 to 6, forming a precipitate, washing the formed precipitate after solid-liquid separation, and calcining the precipitate at 600° C. or more and 1300° C. or less.

4. A method for producing an indium oxide-tin oxide powder, which comprises supplying to react an aqueous solution of an indium salt, an aqueous solution of a tin salt and an aqueous alkaline solution into water at 40° C. or more and less than 100° C. so that the pH during the reaction is maintained within the range from 4 to 6, forming a precipitate, washing the formed precipitate after solid-liquid separation, and calcining the precipitate at 600° C. or more and 1300° C. or less to produce an indium oxide-tin oxide powder in which a content of tin oxide is from 2 to 20% by weight, a particle size calculated from the BET specific surface area and the theoretical density of indium oxide-tin oxide is from 0.1 μm or more to 0.5 μm or less, an average agglomerated particle size is 1 μm or less and a content of halogen is 0.1% by weight or less, wherein the powder is capable of being sintered to form a sintered body having a relative density of 95% or more.

5. The method according to claim 4, wherein the calcination is performed at 800° C. or more and 1200° C. or less.

6. The method according to claim 4, wherein the calcination is performed in an atmosphere containing 1% by volume or more of a hydrogen halide gas or a halogen gas.

7. The method according to claim 4, wherein the indium oxide-tin oxide powder is deagglomerated after calcining.

8. The method according to claim 4, wherein the indium oxide-tin oxide powder is washed with water or an aqueous alkaline solution or heat-treated in an atmosphere containing 0.1% by volume or more of at least one gas selected from the group consisting of water vapor and oxygen at 600° C. or more and 1300° C. or less after calcining.

9. The method according to claim 4, wherein the indium oxide-tin oxide powder is washed with water or an aqueous alkaline solution or heat-treated in an atmosphere containing 0.1% by volume or more of at least one gas selected from the group consisting of water vapor and oxygen at 600° C. or more and 1300° C. or less after calcining and further deagglomeration.

10. A method for producing an indium oxide-tin oxide powder, which comprises supplying to react an aqueous mixed solution of an indium salt and a tin salt and an aqueous alkaline solution into water at 40° C. or more and less than 100° C. so that the pH during the reaction is maintained within the range from 4 to 6, forming a precipitate, washing the formed precipitate after solid-liquid separation, and calcining the precipitate at 60° C. or more and 1300° C. or less to produce an indium oxide-tin oxide powder in which a content of tin oxide is from 2 to 20% by weight, a particle size calculated from the BET specific surface area and the theoretical density of indium oxide-tin oxide is from 0.1 μm or more to 0.5 μm or less, an average agglomerated particle size is 1 μm or less and a content of halogen is 0.1% by weight or less, wherein the powder is capable of being sintered to form a sintered body having a relative density of 95% or more.

11. The method according to claim 10, wherein the calcination is performed at 800° C. or more and 1200° C. or less.

12. The method according to claim 10, wherein the calcination is performed in an atmosphere containing 1% by volume or more of a hydrogen halide gas or a halogen gas.

13. The method according to claim 10, wherein the indium oxide-tin oxide powder is deagglomerated after calcining.

14. The method according to claim 10, wherein the indium oxide-tin oxide powder is washed with water or an aqueous alkaline solution or heat-treated in an atmosphere containing 0.1% by volume or more of at least one gas selected from the group consisting of water vapor and oxygen at 600° C. or more and 1300° C. or less after calcining.

15. The method according to claim 10, wherein the indium oxide-tin oxide powder is washed with water or an aqueous alkaline solution or heat-treated in an atmosphere containing 0.1% by volume or more of at least one gas selected from the group consisting of water vapor and oxygen at 600° C. or more and 1300° C. or less after calcining and further deagglomeration.

16. A method for producing an indium oxide-tin oxide sintered body, which comprises molding an indium oxide-tin oxide powder to obtain a molded body, wherein a content of tin oxide is from 2 to 20% by weight, a particle size calculated from the BET specific surface area and the theoretical density of indium oxide-tin oxide is from 0.1 μm or more to 0.5 μm or less, an average agglomerated particle size is 1 μm or less and a content of halogen is 0.1% by weight or less, wherein the powder is capable of being sintered to form a sintered body having a relative density of 95% or more, and sintering the molded body at 1450° C. or more and 1650° C. or less.

17. The method according to claim 16, wherein the molded body is sintered in the atmosphere containing an oxygen gas.

18. A method for producing an indium oxide-tin oxide sintered body, which comprises molding the indium oxide-tin oxide powder to obtain a molded body, wherein a content of tin oxide is from 2 to 20% by weight, a particle size calculated from the BET specific surface area and the theoretical density of indium oxide-tin oxide is from 0.1 μm or more to 0.5 μm or less, an average agglomerated particle size is 1 μm or less and a content of halogen is 0.1% by weight or less, wherein the powder is capable of being sintered to form a sintered body having a relative density of 95% or more, the indium oxide-tin oxide powder being prepared by a method which comprises supplying to react an aqueous solution of an indium salt, an aqueous solution of a tin salt and an aqueous alkaline solution into water at 40° C. or more and less than 100° C. so that the pH during the reaction is maintained within the range from 4 to 6, forming a precipitate, washing the formed precipitate after solid-liquid separation, and calcining the precipitate at 600° C. or more and 1300° C. or less, and sintering the molded body at 1450° C. or more and 1650° C. or less.

19. The method according to claim 18, wherein the molded body is sintered in the atmosphere containing an oxygen gas.

20. The method according to claim 18, wherein the indium oxide-tin oxide powder is washed with water or an aqueous alkaline solution or heat-treated in an atmosphere containing 0.1% by volume or more of at least one gas selected from the group consisting of water vapor and oxygen at 600° C. or more and 1300° C. or less after calcining.

21. The method according to claim 18, wherein the indium oxide-tin oxide powder is washed with water or an aqueous alkaline solution or heat-treated in an atmosphere containing 0.1% by volume or more of at least one gas selected from the group consisting of water vapor and oxygen at 600° C. or more and 1300° C. or less after calcining and further deagglomeration.

22. A method for producing an indium oxide-tin oxide sintered body, which comprises molding the indium oxide-tin oxide powder to obtain a molded body, wherein a content of tin oxide is from 2 to 20% by weight, a particle size calculated from the BET specific surface area and the theoretical density of indium oxide-tin oxde is from 0.1 μm or more to 0.5 μm or less, an average aglomerated particle size is 1 μm or less and a content of halogen is 0.1% by weight or less, wherein the powder is capable of being sintered to form a sintered body having, a relative density of 95% or more, the indium oxide-tin oxide powder being prepared by a method which comprises supplying to react an aqueous mixed solution of an indium salt and a tin salt and an aqueous alkaline solution into water at 40° C. or more and less than 100° C. so that the pH during the reaction is maintained within the range from 4 to 6, forming a precipitate, washing the formed precipitate after solid-liquid separation, and calcining the precipitate at 600° C. or more and 1300° C. or less, and sintering the molded body at 1450° C. or more and 1650° C. or less.

23. The method according to claim 22, wherein the indium oxide-tin oxide powder is washed with water or an aqueous alkaline solution or heat-treated in an atmosphere containing 0.1% by volume or more of at least one gas selected from the group consisting of water vapor and oxygen at 600° C. or more and 1300° C. or less after calcining.

24. The method according to claim 22, wherein the indium oxide-tin oxide powder is washed with water or an aqueous alkaline solution or heat-treated in an atmosphere containing 0.1% by volume or more of at least one gas selected from the group consisting of water vapor and oxygen at 600° C. or more and 1300° C. or less after calcining and further deagglomeration.

* * * * *